No. 782,831. PATENTED FEB. 21, 1905.
D. DAVIDSON & W. I. KENISON.
REVERSIBLE AUTOMATIC FRICTION CLUTCH PULLEY.
APPLICATION FILED OCT. 19, 1903.
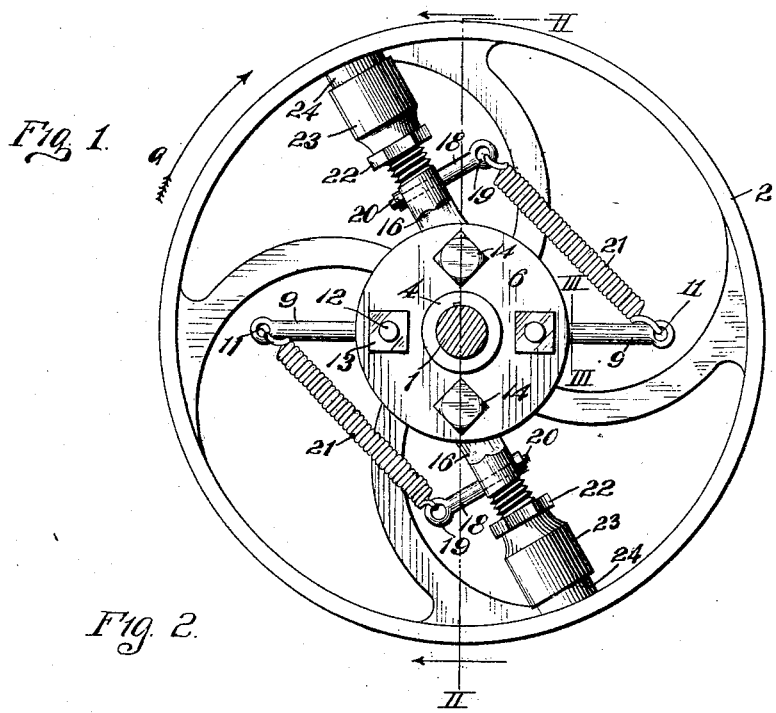
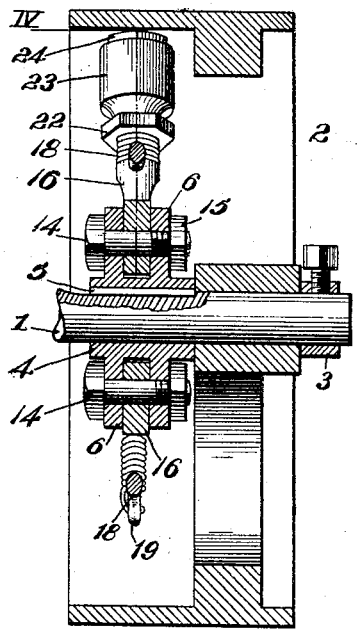
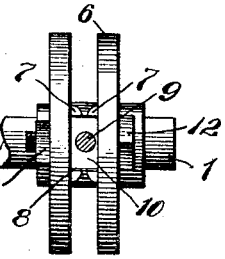
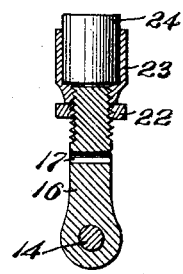
Witnesses
Frank Glore
H. C. Rodgers
Inventors
D. Davidson & W. I. Kenison
By George J. Thorpe
Atty.

No. 782,831.

Patented February 21, 1905.

UNITED STATES PATENT OFFICE.

DALTON DAVIDSON AND WILLIAM I. KENISON, OF NILES, KANSAS.

REVERSIBLE AUTOMATIC FRICTION CLUTCH-PULLEY.

SPECIFICATION forming part of Letters Patent No. 782,831, dated February 21, 1905.

Application filed October 19, 1903. Serial No. 177,514.

*To all whom it may concern:*

Be it known that we, DALTON DAVIDSON and WILLIAM I. KENISON, citizens of the United States, residing at Niles, in the county of Ottawa and State of Kansas, have invented certain new and useful Improvements in Reversible Automatic Friction Clutch-Pulleys, of which the following is a specification.

Our invention relates to friction clutch-pulleys, and has for its object to produce a device of this character for use particularly on the fan-shaft of the wind-blowers of grain-separators, which is always in or out of gear, according to the direction of rotation, and which operates noiselessly and efficiently.

A further object is to produce a clutch mechanism of this character which is of simple, strong, durable, compact, and cheap construction.

With these objects in view the invention consists in certain novel features of construction and organization, as hereinafter described, and in order that it may be fully understood reference is to be had to the accompanying drawings, in which—

Figure 1 represents in side elevation a friction clutch-pulley embodying our invention. Fig. 2 is a vertical section taken on the line II II of Fig. 1. Fig. 3 is a section on the line III III of Fig. 1. Fig. 4 is a section on the dotted line IV of Fig. 2, but with the spring-attaching pin removed.

In the said drawings, 1 designates the fan-shaft of a wind-blower or other machine, and 2 a pulley journaled thereon and limited as to movement in one direction by an adjustable collar 3, by preference the major portion of the rim of the pulley being disposed at one side of its hub, as shown most clearly in Fig. 2. 4 designates a hub keyed, as at 5, or otherwise rigidly secured on the shaft within the pulley and forming a shoulder to prevent movement of the pulley in the opposite direction from collar 3. Hub 4 is provided with a pair of parallel circular flanges 6, and at diametrically opposite points said flanges are preferably formed at their inner sides with parallel lugs 7, so as to provide radial grooves 8 to receive the squared bases 10 of arms 9, projecting radially from and at diametrically opposite sides of the shaft. Said arms have eyes 11 at their outer ends and are held reliably in position by bolts 12, which extend through them and flanges 6, nuts 13 engaging the projecting ends of the bolts. At equal distances from and between said bolts 12 similar bolts 14 extend through the flanges, and are secured thereto by nuts 15, and mounted pivotally on bolts 14 between the flanges are threaded arms 16, having holes 17, through which extend the stems of pins 18, said pins having eyes 19 at their outer ends and having their stems 20 engaged by nuts to secure them reliably in place. The pins project in opposite directions and are connected to the contiguous arms 9 by retractile springs 21, the ends of the springs engaging the eyes of said arms and pins, as shown.

Secured upon the threaded outer ends of the pivoted arms 16 are lock-nuts 22, and also secured upon the ends outward of said nuts are sockets 23 for the friction-shoes 24, of leather or equivalent material, these friction-shoes being held with a yielding pressure by the springs 21 against the inner surface of the rim of the pulley, the parts being so proportioned that the pivoted shoe-carrying arms shall extend tangentially, or approximately so, with respect to the shaft, as shown in Fig. 1.

In operation the belt-pulley, driven in the direction indicated by the arrow $a$ through the medium of a belt, (not shown,) imparts movement to the shaft by engagement with the friction-shoes, it being obviously impossible for the pulley to rotate in the direction indicated without rotating the shaft, because of the angular disposition of the shoe-carrying arms with respect to a radial line drawn from the center of the shaft to the center of each friction-shoe. When the pulley is revolving as indicated, it, coöperates with the springs 21 in compelling the flanged hub and therefore the shaft to rotate at an equal speed, as stated; but should the pulley speed slow down the springs 21 yield sufficiently to allow the friction-shoes to slide against the rim of the pulley, the momentum gained by the shaft carrying it along for at least a few revolutions at a greater speed than the pulley. As this momentum becomes spent and the speed of the shaft slows down to that of the pulley the latter again and instantly binds upon the shoes and compels the shaft to move with it at the same speed. It will thus be seen that this pulley does not depend for its action upon any particular speed, and therefore differs from the ordinary clutch-pulley, which usually must attain a certain speed before it operates the clutch. In other words, in this case the pulley binds upon the clutch and moves the latter, whereas usually the clutch binds upon the pulley and acting as a governor releases the same when the speed is too great.

A device of this kind is especially good for wind-blowers, as it relieves the belt of all strain and also the fan or gearing in case the cylinder or other driving mechanism is suddenly checked or stopped, as hereinbefore suggested. It furthermore has the advantage over the ordinary clutch-pulley in that it is always in gear when the pulley is revolving in the direction indicated by the arrow—that is, when the pulley is revolving at a uniform speed with the shaft—which is always the case except when the pulley movement has been checked through some cause and has therefore permitted the shaft to make a number of revolutions at a higher speed, the shoes sliding inoperatively on the pulley-rim. Furthermore, this device is free from the annoying click of ratchets dropping into place. The springs 21 are employed simply to hold the shoes in contact with the pulley-rim at all times, the tendency of the pulley to swing the shoe-carrying arms forwardly on their pivots really holding the parts in operative relation. The device operates automatically, because it instantly establishes the rigid relation necessary for simultaneous movement when the speed of the pulley equals that of the shaft and as quickly destroys such rigid relation when the speed of the pulley falls below that of the shaft from any cause, and in the fact that it is automatic it also possesses an advantage over the ordinary friction-clutch. The device can also be adjusted for operation in the opposite direction by removing the pulley from the shaft, changing the shoe-carrying arms to the opposite angles, and reversing the springs 21, all of which can be accomplished without the aid of a tool except a wrench to loosen the set-screw holding the collar on the end of the shaft.

The device is adjustable to accommodate pulleys or wheels of varying diameters and to compensate for wear of the friction-shoes. To shorten the arms, the lock-nuts are first turned and then the sockets are adjusted. To lengthen them, the sockets are first adjusted and then backed up by the adjustment of the lock-nuts, as will be readily understood.

From the above description it will be apparent that we have produced a friction clutch-pulley embodying the features of advantage enumerated as desirable, and while we have illustrated and described its preferred embodiment it is to be understood that the device is susceptible of change in various particulars without departing from its essential spirit and scope or sacrificing any of the advantages of the invention.

Having thus described the invention, what we claim as new, and desire to secure by Letters Patent, is—

1. A friction clutch-pulley, comprising a shaft, a driven wheel thereon, a collar rigid on the shaft, an arm pivoted to the collar and extending tangentially of the shaft and threaded at its outer end, a socket screwed on said arm and provided with a friction-shoe to engage the inner side of the wheel, and means for yieldingly pressing the shoe-carrying end of the arm in the same direction as the wheel is driven.

2. A friction clutch-pulley, comprising a shaft, a driven wheel journaled thereon, a collar rigid on the shaft, arms pivoted to the collar and threaded at their outer ends, sockets screwed on said arms, lock-nuts engaging the arms at the base of the sockets, friction-shoes fitting in the sockets, and retractile springs for forcing said pivoted arms toward positions where they can extend radially of the shaft.

3. A friction clutch-pulley, comprising a shaft, a driven wheel journaled thereon, a collar rigid on the shaft, a pair of arms pivoted to and projecting oppositely from the collar and extending tangentially of the shaft and threaded at their outer ends, sockets screwed on said arms and provided with friction-shoes, pins projecting oppositely from said arms rigid arms projecting oppositely from the collar, and retractile springs connecting said rigid arms and pins, substantially as described.

In testimony whereof we affix our signatures in the presence of two witnesses.

DALTON DAVIDSON.
WILLIAM I. KENISON.

Witnesses:
LYMAN B. BEARDSLEY,
P. J. SLIMM.